United States Patent [19]
Tachihara et al.

[11] Patent Number: 5,798,851
[45] Date of Patent: Aug. 25, 1998

[54] APPARATUS FOR CORRECTING SCANNING POSITION IN OPTICAL SCANNER

[75] Inventors: Satoru Tachihara; Ryota Ogawa; Katsuhiro Yoshino, all of Tokyo, Japan

[73] Assignee: Asahi Kogaku Kogyo Kabushiki Kaisha, Tokyo, Japan

[21] Appl. No.: 838,015

[22] Filed: Apr. 22, 1997

Related U.S. Application Data

[63] Continuation of Ser. No. 608,310, Feb. 28, 1996, abandoned, which is a continuation of Ser. No. 294,997, Aug. 24, 1994, abandoned.

[30] Foreign Application Priority Data

Aug. 25, 1993 [JP] Japan ................... 5-210417

[51] Int. Cl.$^6$ ................... G02B 5/32; G02B 26/08
[52] U.S. Cl. ................... 359/18; 359/209; 359/212; 359/216; 347/248; 347/250
[58] Field of Search ................... 359/17, 18, 209, 359/212, 216; 235/457; 347/131, 132, 133, 248, 249, 250, 254, 255

[56] References Cited

U.S. PATENT DOCUMENTS

| | | | |
|---|---|---|---|
| 4,639,073 | 1/1987 | Yip et al. | 359/315 |
| 4,779,944 | 10/1988 | Ritter et al. | 359/17 |
| 4,786,126 | 11/1988 | Kramer | 359/18 |
| 4,834,477 | 5/1989 | Tomita et al. | 359/209 |
| 4,922,266 | 5/1990 | Bidner et al. | 347/250 |
| 4,991,917 | 2/1991 | Yang | 359/17 |
| 5,124,829 | 6/1992 | Ishikawa | 359/204 |
| 5,157,522 | 10/1992 | Markis | 359/18 |
| 5,541,637 | 7/1996 | Ohashi et al. | 347/248 |

*Primary Examiner*—Paul M. Dzierzinski
*Assistant Examiner*—Darren E. Schuberg
*Attorney, Agent, or Firm*—Greenblum & Bernstein P.L.C.

[57] ABSTRACT

An optical scanner including a light source which is turned ON and OFF in accordance with drawing data. A hologram deflector, made of a rotatable planar hologram disc, provided with a plurality of hologram facets through which light emitted from the light source passes, is rotated to scan an image surface with light emitted from the light source. An optical detector detects light passing in a scanning direction through at least a first reference point, for the commencement of the scanning, and a second reference point, for the completion of the scanning. A scanning time detector detects a scanning time period in which the light deflected by each hologram facet of the hologram disc, passes the first reference point and reaches the second reference point. Finally, a frequency varying device varies the frequency of the light source for each hologram facet in accordance with a unique scanning time period directed by the scanning time detector for each hologram facet.

26 Claims, 13 Drawing Sheets

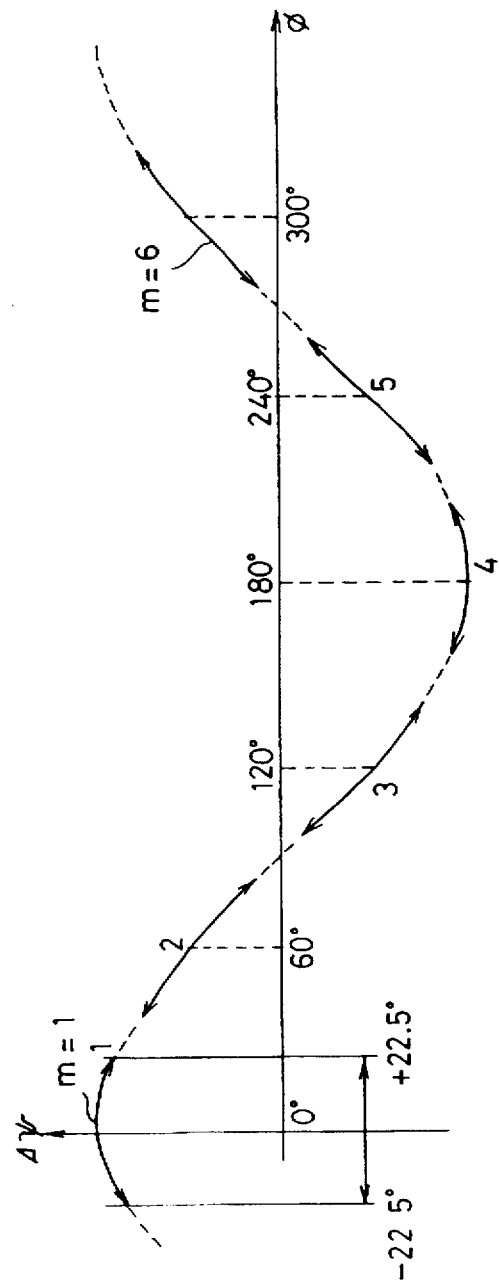

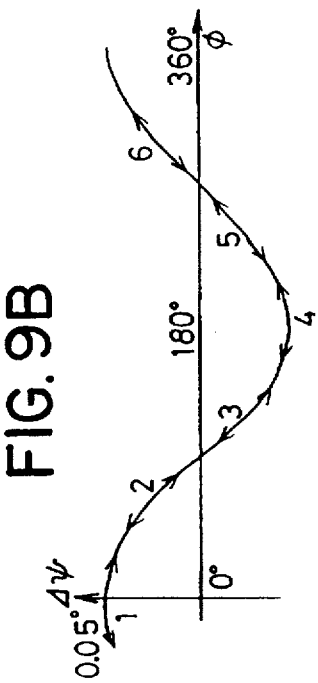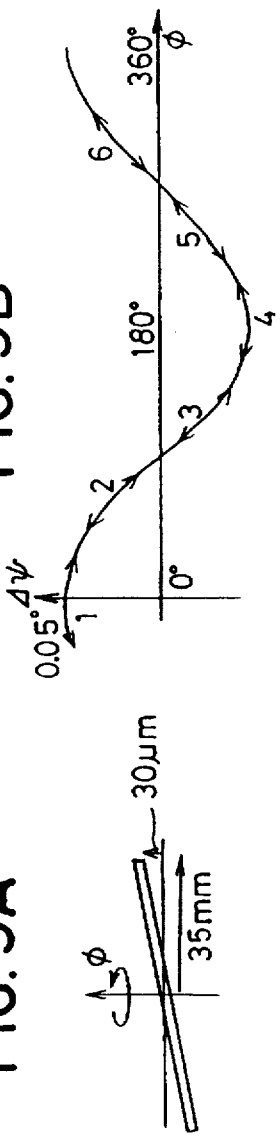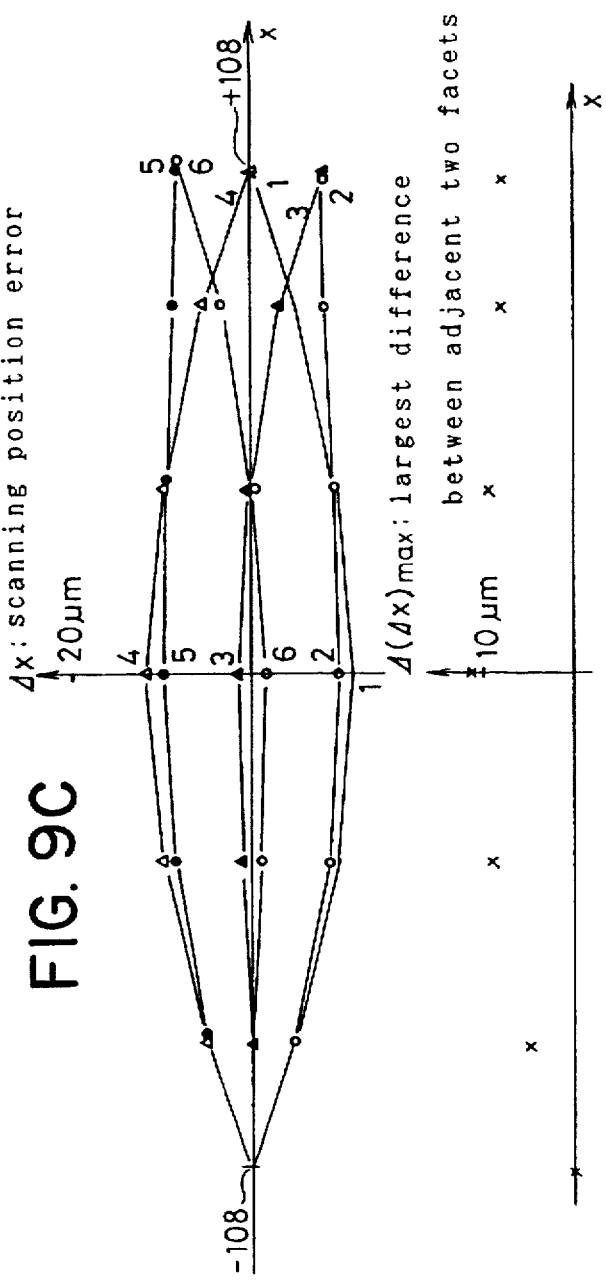

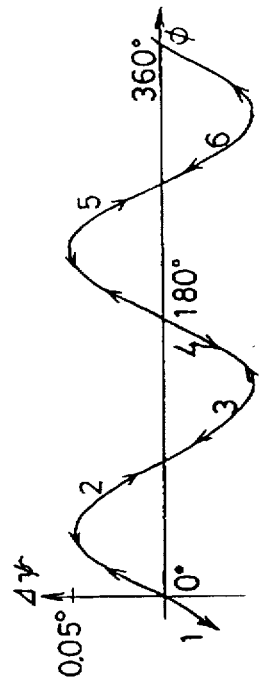
FIG.10A
FIG.10B
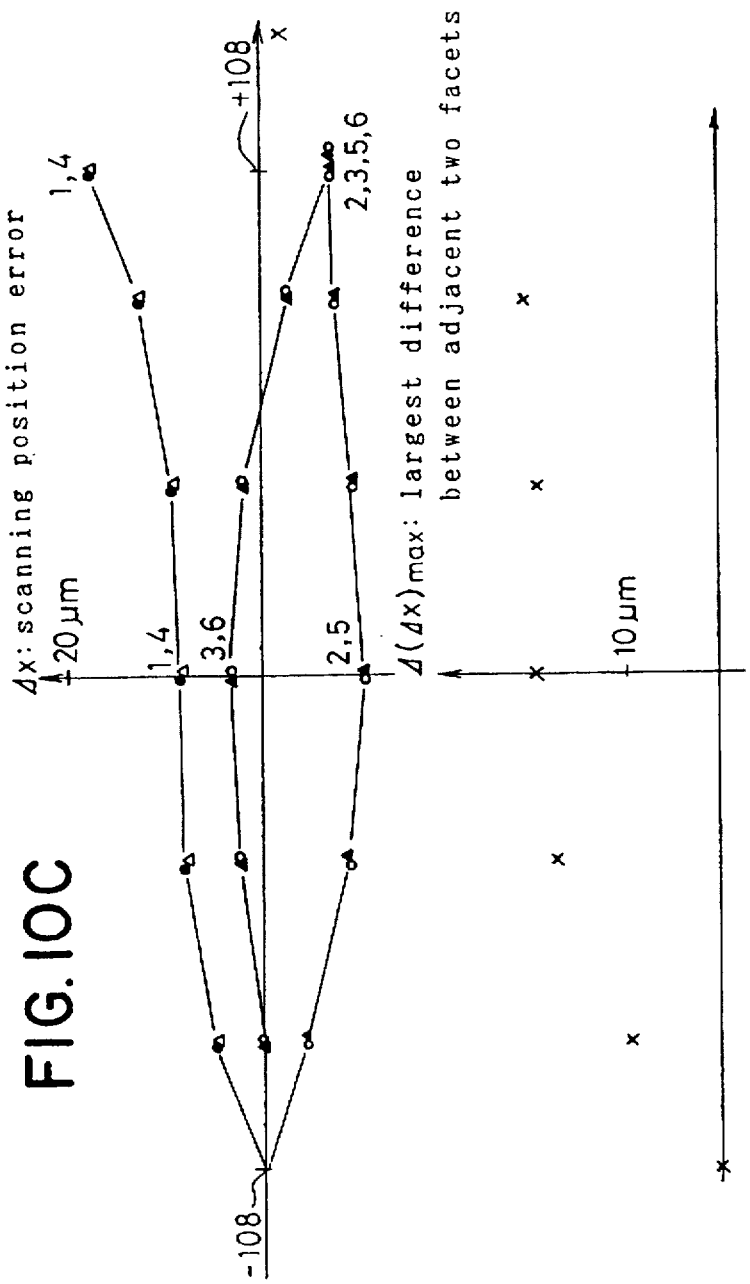
FIG.10C

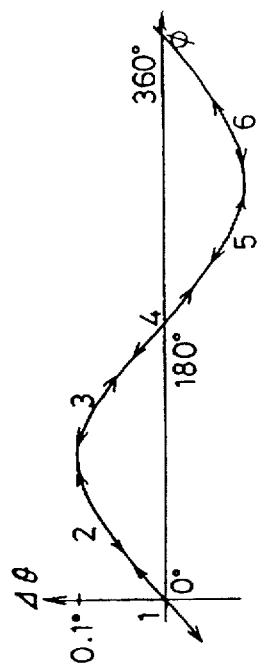
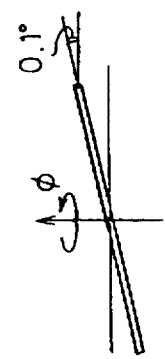
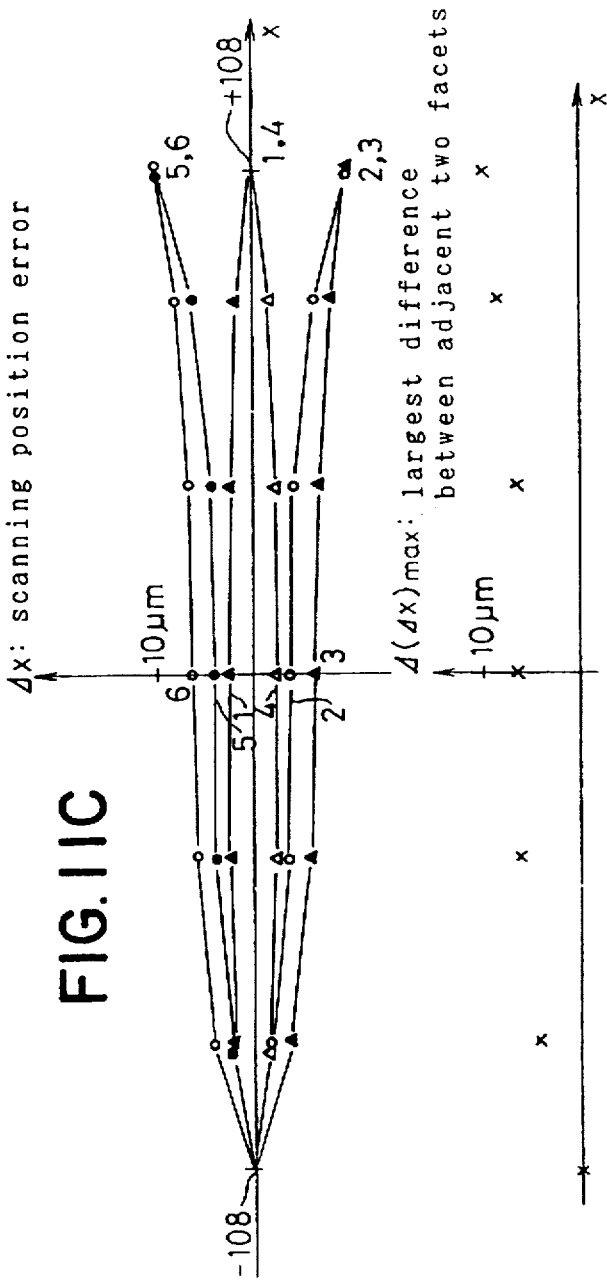

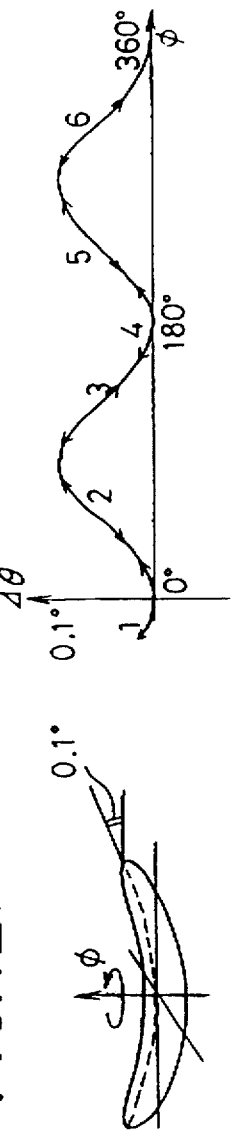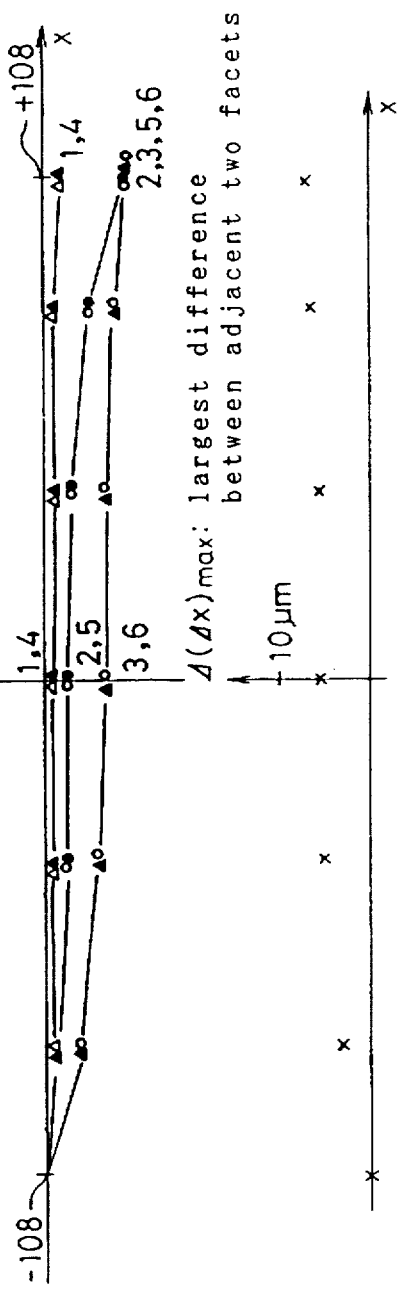

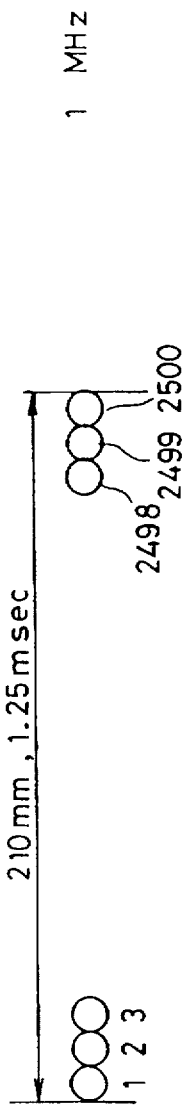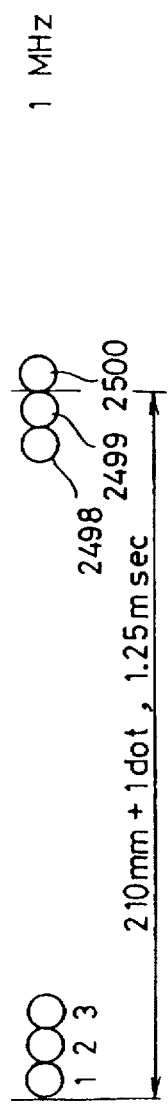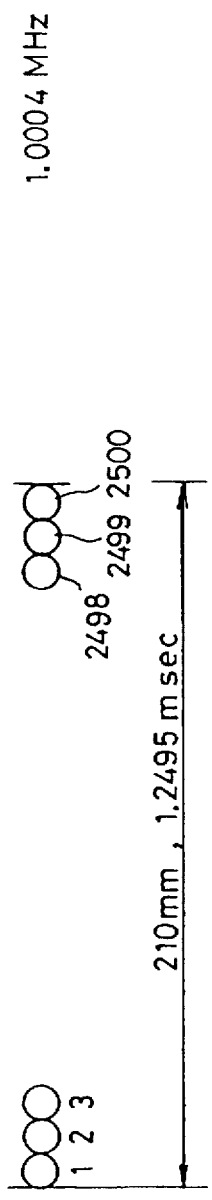

APPARATUS FOR CORRECTING SCANNING POSITION IN OPTICAL SCANNER

This application is a continuation of application Ser. No. 08/608,310, filed Feb. 28, 1996, now abandoned, which is a continuation of application Ser. No. 08/294,997, filed Aug. 24, 1994, now both abandoned.

BACKGROUND OF THE INVENTION

1. Field of the Invention

The present invention relates to an apparatus for correcting a scanning position in an optical scanner using a deflector.

2. Description of the Related Art

In a known optical deflector that moves scanning laser beams to scan a photosensitive body, a polygonal mirror or hologram deflector is used. The hologram deflector is usually made of a hologram disc in the form of a thin circular plate. The hologram disc is provided with a plurality of hologram facets spaced at an equi-angular distance along an imaginary circle whose center is located on the center axis of the hologram disc about which the latter rotates. The hologram disc is made of a glass or plastic substrate on which a thin optical plastic layer with a predetermined pattern is formed, for example, by a stamping or the like, to provide an optical wavefront converting function, etc.

The applicability of the hologram disc, for example, to a laser printer has been studied. Nevertheless, there is no detailed analysis on the adverse influences on the scanning position, caused by possible deformations of the hologram disc.

SUMMARY OF THE INVENTION

The inventors of the present invention have found that if a deformation of the hologram disc occurs, there is an error caused in the scanning position.

Accordingly, a primary object of the present invention is to provide a correcting apparatus which eliminates an error in the scanning position due to a deformation of the hologram disc.

Another object of the present invention is to provide a correcting apparatus for a scanning position which can be applied to an optical deflector in an optical scanner.

To achieve the object mentioned above, according to the present invention, there is provided an apparatus to correct the error in the scanning position for an optical scanner which includes a light source is turned ON and OFF in accordance with drawing data, and a hologram deflector made of a rotatable planar hologram disc. The hologram deflectoris provided on a peripheral surface of the hologram disc with a plurality of hologram facets, through which light emitted from the light source passes, and is rotated to scan an image surface with the light emitted from the light source. The apparatus is improved by an optical detector which detects the light that passes through at least a first reference point for the commencement of the scanning and a second reference point for the completion of the scanning, in a scanning direction, a scanning time detector which detects the scanning time period in which the light deflected by each of the hologram facets of the hologram disc takes to travel from the first reference point to the second reference point, and a frequency varying means for varying the frequency of the light source for each hologram facet so that the light source is turned ON and OFF within a predetermined drawing length in accordance with a unique scanning time period for each hologram facet detected by the scanning time detector.

The present invention is particularly characterized in that the scanning time period in which the light deflected by the hologram facets of the hologram disc takes to travel from the first reference point to the second reference point is detected for each facet, and that the ON-OFF frequency of the light source is varied in accordance with the unique scanning time period detected for each facet, so that a predetermined number of ON-OFF operations of the light source is effected within a predetermined period. Hence, the scanning position error can be corrected by a simple structure.

The hologram disc is provided with a plurality of hologram facets concentrically arranged in a circumferential direction at a precise distance apart. Accordingly, the second reference point of the scanning light deflected by a hologram facet and the first reference point of the scanning light to be deflected by a subsequent hologram facet can be detected by the single optical detector.

It is not necessary to carry out the detection of the scanning time period for each hologram facet using the scanning time detector and the change of the frequency of the light source for each hologram facet by the frequency varying means every time the facets receive the scanning light. For instance, the detection of the scanning time period is measured only at the commencement of the rotation of the hologram disc and the frequency obtained in accordance with the scanning time period can be stored in a memory.

The present invention is particularly advantageous when applied to an optical scanner using a rotatable hologram deflector. However, the present invention can also be applied to an optical scanner using a rotatable polygonal mirror or the like, including a plurality of rotating facets (reflecting surfaces).

To this end, according to another aspect of the present invention, there is provided a correcting apparatus for the scanning position in an optical scanner that includes a light source which is turned ON and OFF in accordance with drawing data, and a rotatable optical deflector which is provided with a plurality of reflecting surfaces to scan an image surface with the light emitted from the light source. The correcting apparatus comprises an optical detector which detects the passing of the light through at least the first reference point for the commencement of the scanning and the second reference point for the completion of the scanning, a scanning time detector which detects a scanning time period between the first reference point and the second reference point, and a frequency varying means for varying the frequency of the light source for each reflecting surface, so that the light source is turned ON and OFF within a predetermined drawing length in accordance with one scanning time for each reflecting surface detected by the scanning time detector.

The present disclosure relates to subject matter contained in Japanese patent application No. 5-210417(filed on Aug. 25, 1993) which is expressly incorporated herein by reference in its entirety.

BRIEF DESCRIPTION OF THE DRAWINGS

The invention will be described below in detail with reference to the accompanying drawings, in which:

FIG. 8 is a diagram of an angle error $\Delta\psi$, caused by a tilting of an angle $\Delta\theta$ of a hologram disc, by way of an example;

FIGS. 9(A)–9(C) are schematic diagrams of an error of a scanning position caused by a circumferential deflection due to a tilt of a hologram disc, by way of example;

FIGS. 10(A)–10(C) are schematic diagrams of an error of a scanning position caused by a circumferential deflection due to a warp of a hologram disc, by way of example;

FIGS. 11(A)–11(C) are schematic diagrams of an error of a scanning position caused by a radial deflection due to a tilt of a hologram disc, by way of example;

FIGS. 12(A)–12(C) are schematic diagrams of an error of a scanning position caused by a radial deflection due to a warp of a hologram disc, by way of example;

FIGS. 13(A), 13(C) conceptual views of the principle for correcting a scanning position, according to the present invention;

DESCRIPTION OF THE PREFERRED EMBODIMENT

Figure 1:
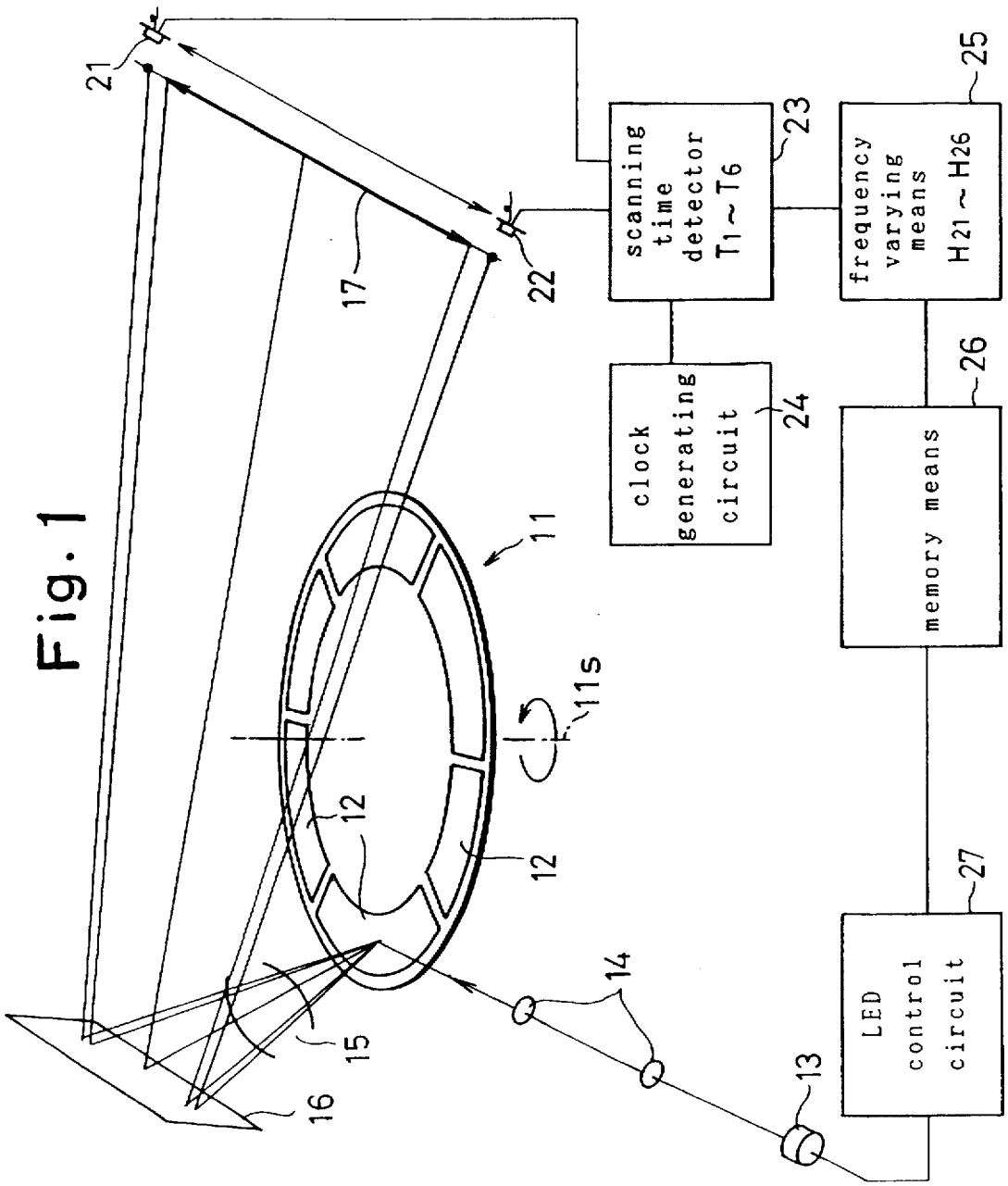
FIG. 1 is a schematic diagram of a scanning position correcting apparatus according to an aspect of the present invention.
Figure 2:
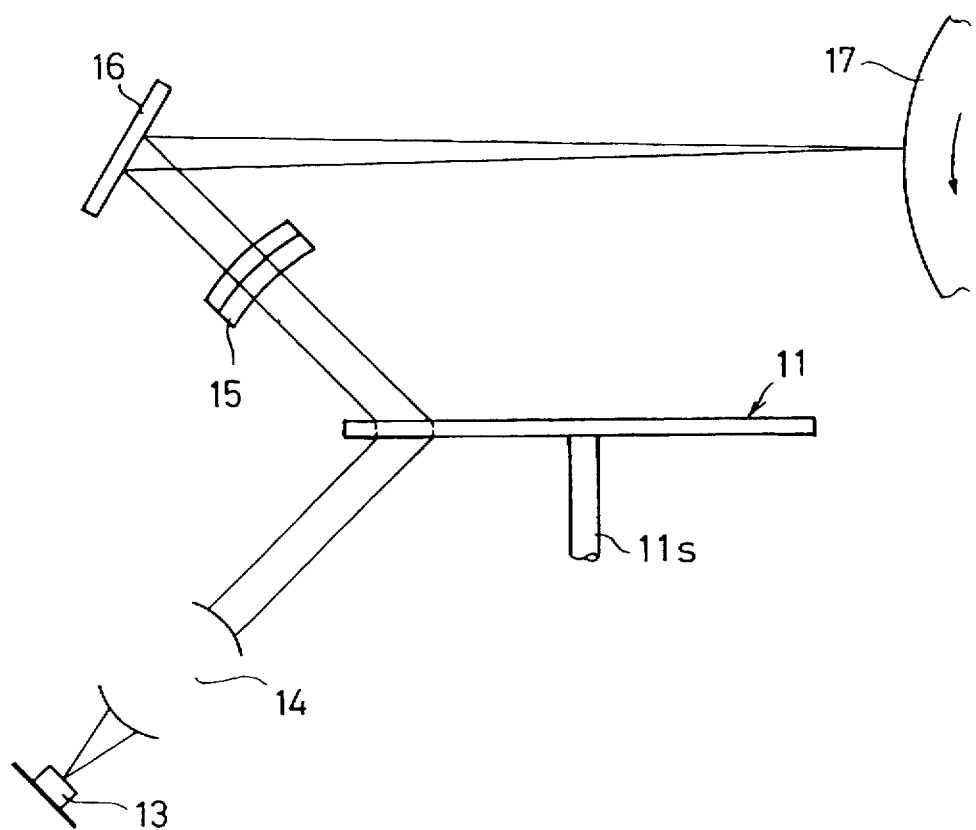
FIG. 2 is a conceptual view of an optical scanner using a hologram disc.

FIGS. 1 and 2 show a basic concept for an optical scanner using a hologram disc (scanning disc) 11. The scanning disc 11 is provided with a plurality of (e.g., six) hologram facets 12 in a circumferential arrangement. The hologram facets 12 are identified by surface Nos. 1 through 6. The laser beams emitted from a laser source 13, turned ON and OFF in accordance with drawing data, are collimated by a collimating lens 14 and deflected by the hologram facets 12 of the scanning disc 11, which rotates about a center axis 11s. Consequently, the laser beams are converged onto a drawing surface (photosensitive drum) 17 through an image forming lens 15 and a reflecting mirror 16. In an ideal situation, the drawing lines to be drawn onto the drawing surface 17, deflected by the hologram facets 12, begin and end at the same start and end points, respectively. However in practice, an error in the scanning position tends to occur due to a possible deformation of the scanning disc 11, i.e., a deviation of the scanning disc 11 from an ideal plane.

The following discussion will be addressed to the inventors' analysis on the error of the scanning position caused by the deformation of the scanning disc 11.

Figure 3A:
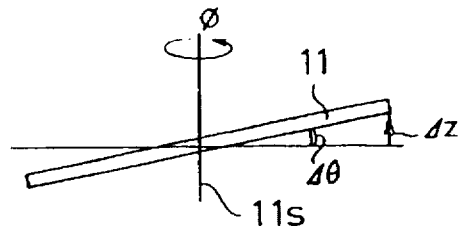
FIGS. 3(A)–3(C) are an explanatory view of an error caused by a tilting of a hologram disc.
Figure 3B:
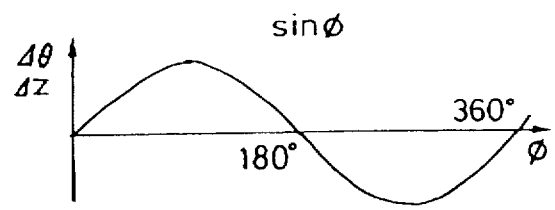
Figure 3C:
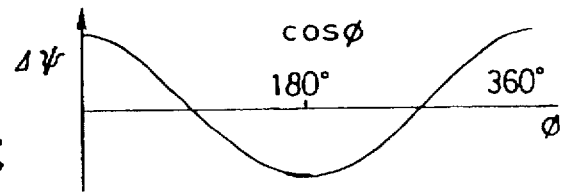
Figure 4A:
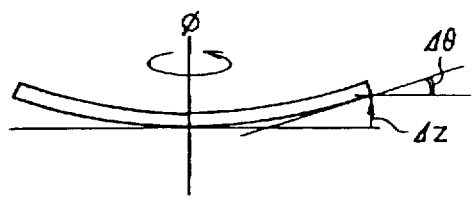
FIGS. 4(A)–4(C) are an explanatory view of an error caused by a cupping of a hologram disc.
Figure 5A:
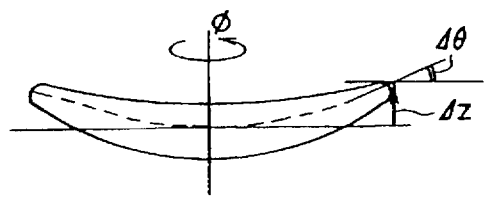
FIGS. 5(A)–5(C) are an explanatory view of an error caused by a warping of a hologram disc.
Figure 5B:
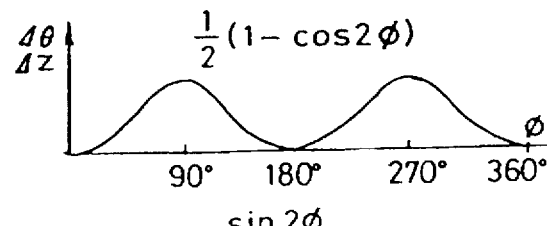
Figure 5C:
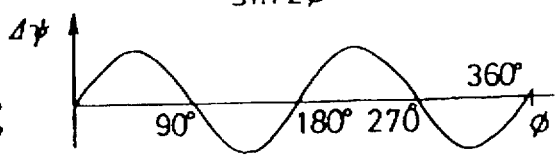

Three kinds of deformation of the scanning disc 11, i.e., tilting shown in FIG. 3(A), a cupping shown in FIG. 4(A), and a warping shown in FIG. 5(A) can be assumed. Tilting refers to an inclination of the circular disc 11 having no deformation with respect to a rotation axis 11s. Strictly speaking, tilt is not a deformation of the circular disc 11, but is one of the causes of error. Accordingly, tilt is included in the concept of the deformation in this specification. Cupping refers to a rotation-symmetry deformation with respect to the rotation axis 11s. Warping refers to a deflection having no rotation-symmetry. Due to these deformations, there are errors in the incident position and the incident angle of the laser beams incident upon the scanning disc 11, which result in an occurrence of jitters or fluctuations in the deflected image.

Assuming that $\Delta z$ designates a positional error in the direction of height; $\Delta\theta$ designates an angular error (radial deflection) in a sub-scanning direction (radial direction of the scanning disc); $\Delta\psi$ designates an angular error (circumferential deflection) in the main scanning direction (circumferential direction of the scanning disc), and, $\phi$ ($0\sim2\pi$) designates an angular position of the scanning disc, the three errors are represented as a function of $\phi$, as shown in FIGS. 3(B), 3(C), 4(B), 4(C), 5(B) AND 5(C).

Figure 4B:
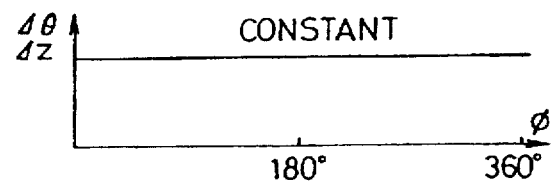
Figure 4C:
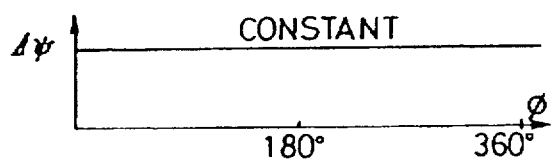

As can be seen in FIGS. 4(A)–4(C), since cupping is a deformation of rotation-symmetry, the cupping error is constant, regardless of the value of $\phi$. This is because the amount of cupping error is same for all the hologram facets 12, so that no jitter of the image takes place.

FIGS. 6(A)–6(D) show the scan jitter due to error $\Delta\psi$, and FIGS. 7(A)–7(D) show the scan jitter due to the errors $\Delta\theta$ and $\Delta z$. The errors $\Delta\theta$ and $\Delta z$ simultaneously occur, the errors are represented by the error $\Delta\theta$. In FIGS. 6 and 7, ① and ② correspond to respective surface numbers of the facets 12. Although there are six facets (surface numbers) in the illustrated embodiment, only two (first and second surfaces) are shown in FIGS. 6 and 7.

Figure 6A:
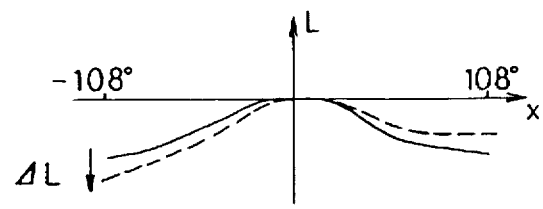
FIGS. 6(A)–6(D) are explanatory views of errors caused by an inclination $\Delta\psi$ of a hologram disc in a circumferential direction thereof.
Figure 7A:
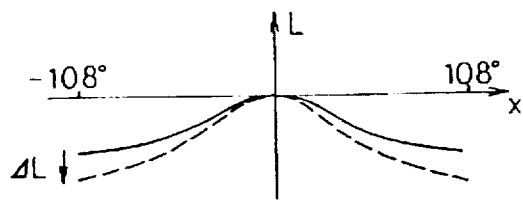
FIGS. 7(A)–7(D) are explanatory views of errors caused by an inclination (deflection) $\Delta\theta$ of a hologram disc in a radial direction thereof.

FIGS. 6(A) and 7(A), show a scanning error ratio determined from the above-mentioned errors. The abscissa represents an image height (drawing length, e.g., −108 mm~108 mm), and the ordinate represents a scanning error ratio L (%). The solid line represents design values, and the phantom line represents values when there are errors. The scanning error ratio L is defined by the following equation:

$$L=\{(x-x_0)/x_0\}\times 100\%$$

wherein "$x_0$" designates the ideal image height (scanning position) based on $f\theta$, and "$x$" the actual image height (scanning position), respectively.

Figure 6B:
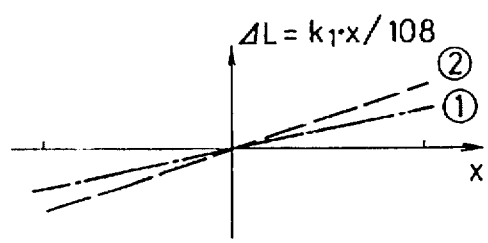
Figure 7B:
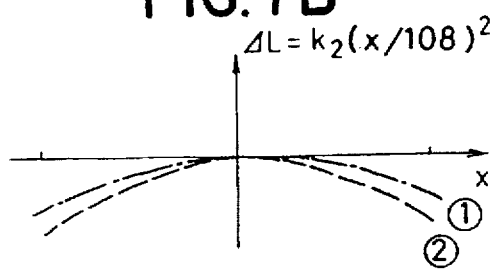

FIGS. 6(B) and 7(B) show the difference of the scanning error ratios (based on $\Delta\psi$ and $\Delta\theta$) indicated by the solid lines and the phantom lines shown in FIGS 6(B) and 7(B), i.e., the variation of the scanning ratios. In FIGS 6(B) and 7(B), it is assumed that for $\Delta\psi$, $\Delta L \propto x$ for; and $\Delta\psi$, $\Delta L \propto x^2$. The relationship between $\Delta L$ and x depends on the optical system to be applied. In general, for $\Delta\psi$, $\Delta L$ is an odd function of x, and for $\Delta\theta$, $\Delta L$ is an even function of x, respectively. If the values of $\Delta\psi$ and $\Delta L$ are different for each hologram facet 12, the slopes of the lines and the development of the quadratic functions are different for each hologram facet 12.

Figure 6C:
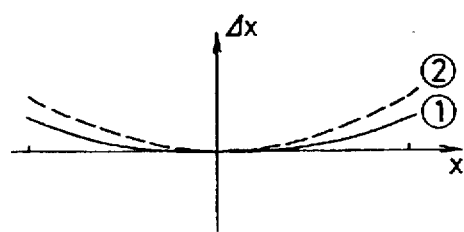
Figure 7C:
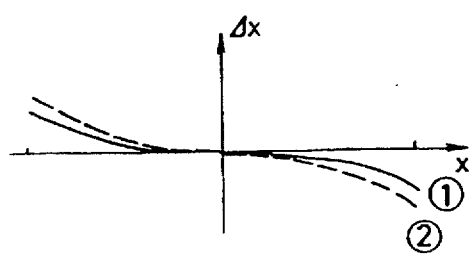

FIGS. 6(C) and 7(C) show the actual error $\propto x$ (ordinate) of the scanning position, where $\Delta x=x\cdot\Delta L$, $\Delta x \propto x^2$ for $\Delta\psi$, and $\Delta x \propto X^3$ for $\Delta\theta$.

Figure 6D:
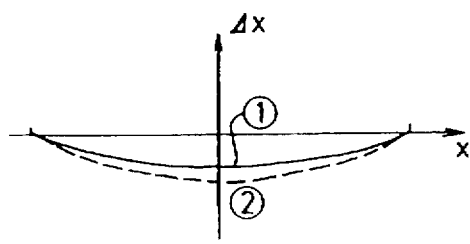
Figure 7D:
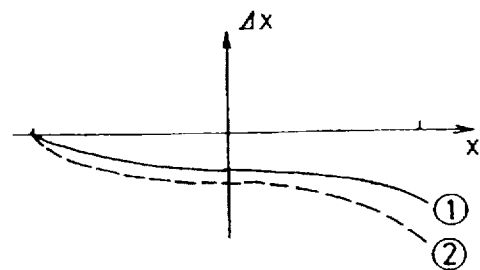

While FIGS. 6(C) and 7(C) represent the actual error $\Delta x$ with reference to the center of facet 12, in practice, the image data starts from the edge of facet 12. FIGS. 6(D) and 7(D) show the actual error Δx is adjusted to compensate for the image data staring at the edge of facet 12.

In the above discussion directed to FIGS. 6 and 7, it is assumed that the values of Δψ and Δθ are constant in each hologram facet 12. However, in practice, the values of Δψ and Δθ vary across each hologram facet 12. If the variation occurs as shown in FIGS. 3(A), 4(A) and 5(A), the variation of the actual error ratio ΔL is given by a multiplication of the sine function shown in FIGS. 3(B) and 5(B) and ΔL shown in FIGS. 6 and 7. This is shown in Table 1 below.

TABLE 1

|  | ΔL based on Δψ | ΔL based on Δθ |
|---|---|---|
| TILT | $K_1 (x/108) A_1 \cos \phi$ | $K_2 (x/108)^2 A_2 \sin \phi$ |
| WARP | $K_1 (x/108) B_1 \cos \phi$ | $K_2 (x/108)^2 (B_2/2)(1-\cos 2\phi)$ | wherein φ represents the phase defined by the following equation when the number of the hologram facets totals:

$$\phi = \phi_0 + 60°(m-1) + \Delta(x/108)$$

where $\phi_0$ represents a the constant (which determines the position of the first facet in the circumferential direction of the scanning disc);

m=1, 2, 3, 4, 5, or 6 (which represents a direction, i.e., phase angle of the six hologram facets and which depends on the number of the hologram facets);

Δrepresents a the rotation angle (60°×0.5×scanning efficiency) of the scanning disc 11 to carry out the half-scan;

x represents the width of the half-scan which is defined by −108≦x≦108.

Note that Δ(x/108) represents the whole scan width normalized to be −1~+1.

FIG. 8 shows an example of the variation Δψ of each hologram facet 12 due to the tilt of the scanning disc. In FIG. 8, $\phi_0$=0, m=6, and the scanning efficiency=75%.

FIGS. 9(A)–9(C) and 10(A)–10(C) show examples (calculation results) of errors due to Δψ on the assumption that the amounts of the tilt and the warp of the scanning disc 11 at 35 mm from the center of rotation thereof are 30 μm. The calculation results are indicated by an error curve for the image height (scanning position) in each facet and the largest difference in the error between the adjacent facets at each image height, respectively.

FIGS. 11(A)–11(C) and 12(A)–12(C) show examples (calculation results) of errors due to Δθ on the assumption that the amounts of the tilt and the warp of the scanning disc 11 are both represented by an inclination of 0.1°.

As can be seen from the foregoing, it is apparent that the deformation of the scanning disc 11 causes an error in the scanning position. In particular, the influence on the scanning position error by Δψ (circumferential deflection) is more serious than that by Δθ (radial deflection).

The present invention is aimed at a correcting a the scanning position error caused by the hologram facets due to the deformation of the scanning disc 11, as mentioned above.

FIGS. 13(A)–13(B) show the principle of the present invention. Assuming that the number of revolutions of the scanning disc 11 having six facets, as shown in FIG. 1, is 6,000 rpm and the scanning efficiency thereof is 75%, the time necessary to scan the facet drawing length L is 1.25 ms. To simplify the calculation, on the assumption that the drawing length is 210 mm (L=210 mm), and the total number of dots (number of picture elements) within the drawing length (=210 mm) is 2,500 in a printer of 300 dpi, the modulation frequency f0 of the laser source 13 on design is equal to (2500/2)/1.25 ms=1.00 MHz.

FIG. 13(A) schematically shows 2500 dots of picture elements within the drawing length (width) of 210 mm to draw an image for 1.25 ms (drawing frequency=1 MHz). If there is an error in the scanning position by one dot (approximately 84 μm=210÷2500 mm) due to the scanning disc 11, as shown in FIG. 13(B), the space of time in which the scanning beams are detected by the optical detectors spaced at a distance of 210 nm (it is assumed here for simplification of calculation that the distance between a first reference point for the commencement of the scanning and a second reference point for the completion of the scanning is equal to the drawing length L, i.e. 210 mm) is given by the equation:

1.25 msec×2499/2500=1.2495 msec.

Note that in practice, the first reference point (starting reference point) is located before a start point at which the scanning is commenced and the second reference point (completing reference point) is located after a completion point at which the scanning ends. Namely, in practice, the distance between the first reference point and the second reference point is usually longer than the drawing length L.

As can be understood from the foregoing, there is an error between the design value (=1.25 msec) and the value (=1.2495 msec) obtained by calculation of 0.0005 msec.

In the present invention, one scanning time period (from the first reference point to the second reference point) is detected, so that the frequency of the laser source 13, which is turned ON and OFF in accordance with drawing data, is varied in accordance with the one scanning time thus detected to correct or eliminate the error in the scanning position.

Namely, the frequency of the laser source 13 is switched to (1 MHz×1.25/1.2495 msec=1.0004 MHz). Consequently, as can be seen in FIG. 13(C), the 2500 dots of picture elements are contained within the drawing length of 210 mm to correct the scanning position error. That is, since the amount of error in the scanning position due to the deformation of the scanning disc 11 varies depending on the facets, the error can be corrected by controlling the modulation frequency of the laser source 13 so as to eliminate the error in accordance with one scanning time for each facet.

The present invention can be applied more advantageously to an optical scanner in which a plurality of facets are arranged in the same plane, such as a hologram disc, so that a continuous deformation of the disc takes place in the circumferential direction thereof, than to a conventional polygonal mirror having a plurality of mirror facets whose surfaces discontinuously lie in different planes.

FIG. 1 shows an embodiment of the present invention, in which there are optical detectors 21 and 22 at the first reference point and the second reference point, in the vicinity of the drawing surface 17. Although the optical detectors are provided immediately behind the image forming surface (drawing surface) of the optical system in the illustrated embodiment, it is not always necessary for the optical detectors to be arranged in the vicinity of the image forming surface. For example, the optical detectors can be disposed far from the image forming surface. In this alternative, a mirror (or mirrors) or the like is provided in the optical path to deflect the bundle of rays toward the optical detectors.

The outputs of the first and second optical detectors 21 and 22 are sent to a scanning time detector 23 which detects the scanning time in which the scanning light moves from the first optical detector 21 to the second optical detector 22 for each facet 12, in response to a clock signal outputted from a clock generating circuit 24. One scanning time for each facet, detected by the scanning time detector 23 is inputted to a frequency varying means 25. Namely, the latter calculates ON-OFF frequencies $H_{21}$, $H_{22}$, $H_{23}$, $H_{24}$, $H_{25}$, and $H_{26}$ of the laser source 13, based on the scanning times $T_1$, $T_2$, $T_3$, $T_4$, $T_5$, and $T_6$ for the six hologram facets 12. The ON-OFF frequencies are determined such that a predetermined number of dots to be drawn is distributed as precise as possible within a predetermined drawing length (width of the drawing line). In the above-mentioned example, the ON-OFF frequencies are determined so that 2500 dots are distributed as precise as possible within the drawing length of 210 mm.

A control circuit (LED control circuit) 27 of the laser source 13 varies the emission frequency of the laser source 13 for the facets 12 in the order determined by the frequency varying means 25. Namely, when the facets 12 receive the light during the rotation of the scanning disc 11, the emission frequency of the light source 13 is varied in accordance with the facet number. A memory means 26 stores the modulation frequency set for each facet 12 and sends frequency data to the control circuit 27.

For a position error including the deformation of the hologram disc, that remains constant throughout the hologram disc life, the selection of the modulation frequency for each facet, need only be carried out once for example at the commencement of the operation of the hologram disc. The selected modulation frequency for each facet is stored in the memory 26. If there is a possibility that the amount of the position error fluctuates through time, that is, for example, if the degree of deformation of the scanning disc 11 (made of a synthetic resin) varies depending on the temperature or humidity, etc., the time period for one scan for each facet is detected at an appropriate interval in time to determine the optimum modulation frequency corresponding thereto, so that the previously stored modulation frequencies in the memory 26 are renewed and replaced with new modulation frequencies thus determined.

In the above-mentioned embodiment in which two optical detectors 21 and 22 are provided at the first and second reference points, it is possible to provide a mirror (or mirrors) to deflect (or bend) the ray that would be otherwise made incident upon the second detector 22 (or first detector 21), toward the first detector 21 (or second detector 22), so that the second detector 22 (or first detector 21) can be dispensed with.

The scanning disc 11 is in the form of a planar plate and the facets 12 are concentrically arranged in a circumferential direction at an extremely small distance apart. Accordingly, since the beginning of one image and the end of the previous image is so small, it is possible to detect the first reference point for a facet and the second reference point for another facet adjacent thereto using a single optical detector 21 or 22. Furthermore, it is also possible to define one scan time period as the time it takes to scan an image and the gap between adjacent images, since the time to scan the gap is so small.

In the above-mentioned embodiment, the time period for one scan is determined by the detection of the passing of the scanning light through the first and second reference points to thereby determine the ON-OFF frequency of the light source for each facet. For more precise control, it is possible to provide an intermediate reference point between the first and second reference points, so that the lapse of time from the first reference point to the intermediate reference point and the lapse of time from the intermediate reference point to the second reference point are detected to vary the ON-OFF frequency of the light source for each half-scan.

One of the most significant features of the present invention resides in the detection of the scanning time period for each facet to vary the ON-OFF frequency of the light source for each facet in accordance with the scanning time thus detected. The present invention can be applied to an optical scanner using a polygonal mirror.

Figure 14:
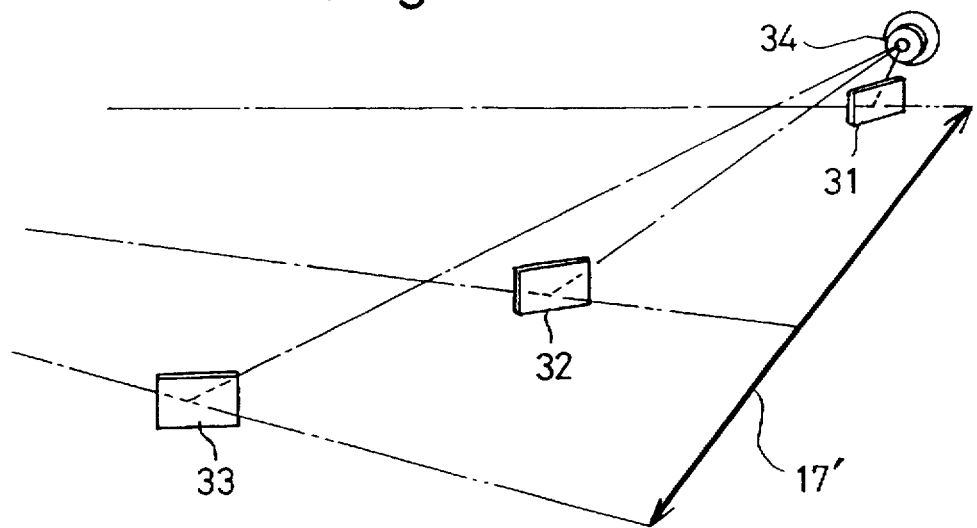
FIG. 14 is a schematic view of a single optical detector which detects light that passes through a first reference point for the commencement of the scanning, an intermediate reference point, and a second reference point for the completion of the scanning.

FIG. 14 shows a modified embodiment of the present invention in which there is a single optical detector which detects the scanning light that passes through the first, intermediate and second reference points. Three mirrors 31, 32 and 33 corresponding to the first, intermediate and second reference points are provided in front of a conjugate image forming surface 17' which is optically equivalent to the drawing surface 17. The mirrors are inclined at predetermined inclination angles so that rays reflected by the mirrors are made incident upon the single optical detector 34. The modified embodiment illustrated in FIG. 14 can be applied to an arrangement including the first and second reference points without the intermediate reference point.

Figure 15:
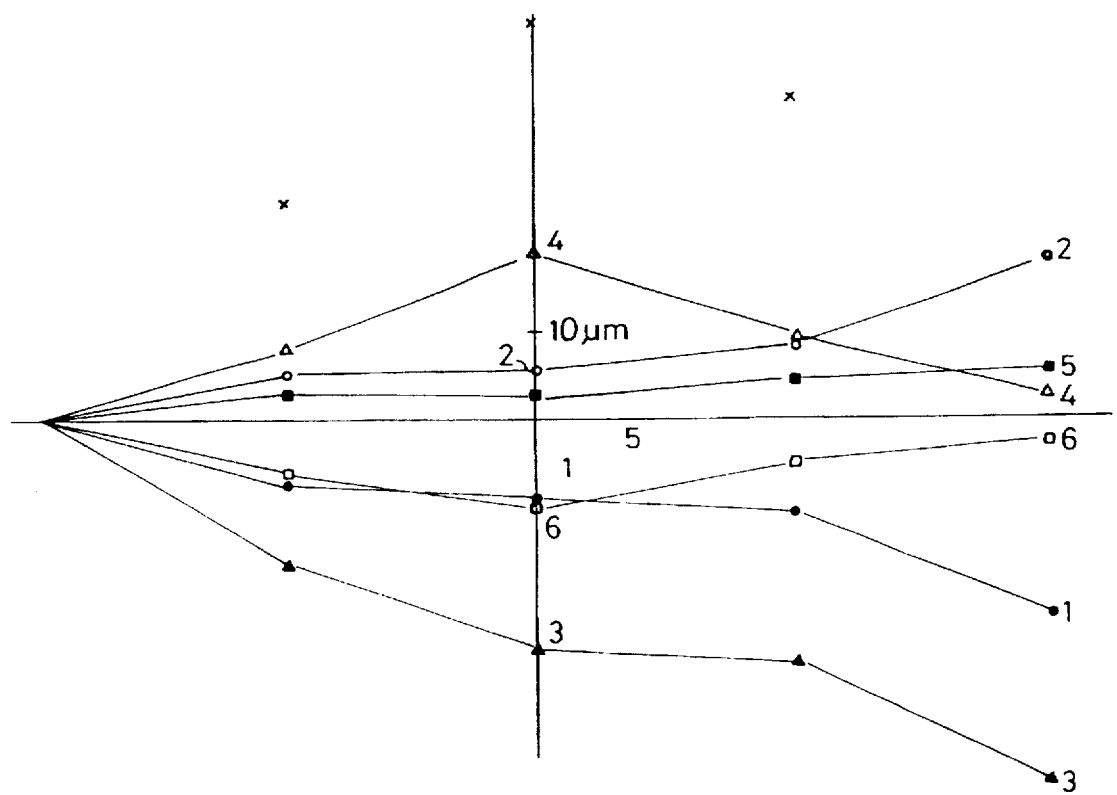
FIG. 15 is a graph of the measurements of an error of a scanning position.

FIG. 15 shows an example of the positional error obtained by the calculation in accordance with the measurement of the deformation of the scanning disc 11. The variation of positional error between the adjacent facets is around 60 μm at the maximum at the extremity of the scanning length, which is approximately equal to one dot.

Figure 16:
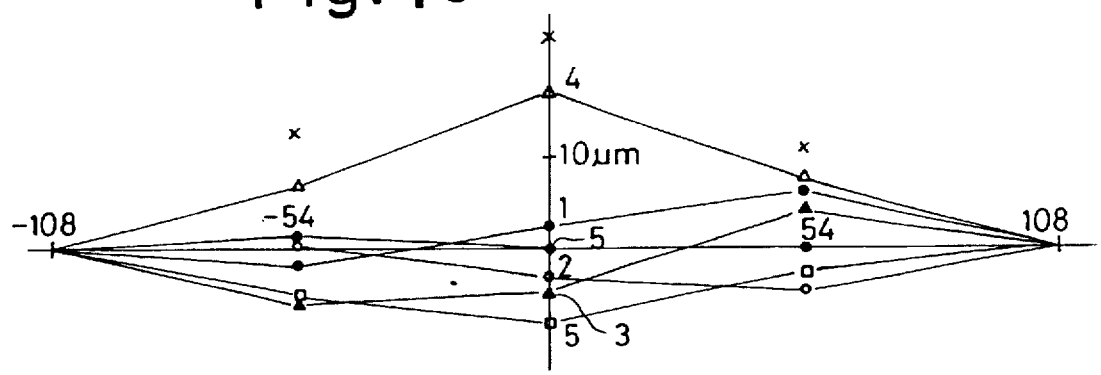
FIG. 16 is a graph of the measurements of an error of a scanning position when the scanning position is corrected in the present invention, by way of example; and, FIG. 17 is a graph of the measurements of an error of a scanning position when the scanning position is corrected in the present invention, by way of example.
Figure 17:
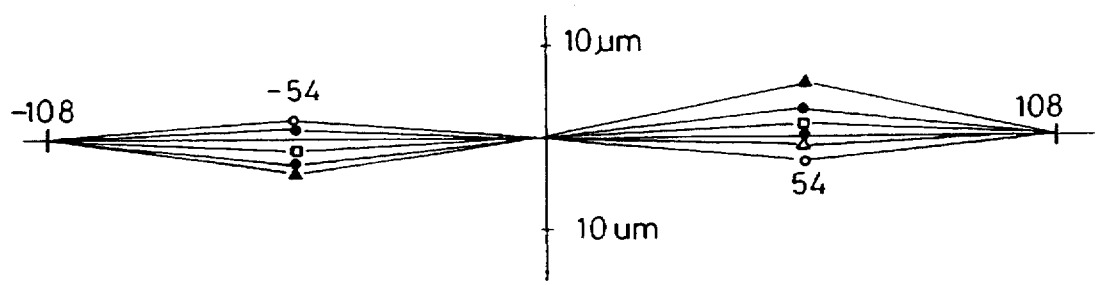

FIGS. 16 and 17 show the variation of the positional error corrected according to the present invention. In FIG. 16, the ON-OFF frequency of the light source 13 for each facet is constant within one scanning time period. In FIG. 17, the ON-OFF frequency of the light source 13 for each facet is varied every half-scan.

In FIGS. 15 through 17, the errors at five points selected within the total scanning length are obtained and indicated by lines connecting the same. In practice, the lines are replaced with smoothly curved lines connecting the points. As can be seen in FIGS. 15 through 17, in the scanning position correcting apparatus according to the present invention, the errors at several points on the drawing line, such as the extremities of the drawing line or the intermediate points, etc., are corrected rather than the errors at all the points on the drawing line. Nevertheless, the errors over the whole drawing line are effectively corrected or reduced significantly.

Although the present invention is mainly aimed at the correction of the errors in the scanning position due to the deformation of the scanning disc 11, the present invention can be equally adapted to correct the errors in the scanning position caused by other reasons, such as irregularity in the rotational speed of the scanning disc 11, etc.

As can be understood from the above discussion, according to the present invention, even if there is a deformation of the scanning disc with respect to an ideal plane, the errors in the scanning position caused thereby can be effectively corrected. Moreover, according to the present invention, a scanning position error in a general optical deflector in an optical scanner can be effectively corrected.

We claim:

1. An optical scanner, comprising:
   a light source which emits light to be modulated so as to be turned ON and OFF in accordance with drawing data formed as a predetermined number of drawing dots with respect to a predetermined drawing length;

a hologram deflector made of a rotatable planar hologram disc which is provided on a peripheral surface thereof with a plurality of a hologram facets through which light emitted from said light source passes, said hologram deflector being rotated to scan an image surface with a light emitted from said light source;

an optical detector that detects a light that passes through at least a first reference point, for a commencement of a scanning, and a second reference point, for a completion of said scanning, in a scanning direction;

a scanning time detector that detects a scanning time period that said light, deflected by each said hologram facet of said hologram disc, takes to travel from said first reference point to said second reference point;

frequency varying means for varying a modulation frequency of said light source for each said hologram facet in accordance with a unique scanning time period for each said hologram facet detected by said scanning time detector so that said predetermined number of drawing dots are contained within said drawing length scanned by each said hologram facet; and intermittent detecting and adjusting means for intermittently detecting said scanning time period and adjusting said modulation frequency for each said hologram facet in response to said intermittent detecting of said scanning time period.

2. An optical scanner according to claim 1, wherein said second reference point of said scanning light deflected by said hologram facet and said first reference point of scanning light to be deflected by a subsequent said hologram facet are detected by a single optical detector.

3. An optical scanner according to claim 1, further comprising a memory means for storing modulation frequency data of said light source to be varied for each said hologram facet.

4. The optical scanner according to claim 1, said frequency varying means comprising means for compensating for deformation of said hologram deflector.

5. The optical scanner according to claim 1, said frequency varying means comprising means for compensating for scanning error.

6. An optical scanner, comprising;

a light source which emits light to be modulated so as to be turned ON and OFF in accordance with drawing data formed as a predetermined number of drawing dots with respect to a predetermined drawing length;

a rotatable optical deflector provided on a peripheral portion thereof with a plurality of reflecting surfaces to scan an image surface with a light emitted from said light source;

an optical detector that detects a passing of said emitted light through at least a first reference point, for a commencement of a scanning, and a second reference point, for a completion of said scanning, in a scanning direction;

a scanning time detector that detects a scanning time period that said emitted light, deflected by each reflecting surface, takes to travel from said first reference point to said second reference point;

frequency varying means for varying a modulation frequency of said light source for each said reflecting surface in accordance with a unique scanning time period for each said reflecting surface detected by said scanning time detector so that said predetermined number of drawing dots are contained within said drawing length scanned by each said reflecting surface; and non-continuous detecting and adjusting means for non-continuously detecting said scanning time period and for adjusting said modulation frequency for each said reflecting surface in accordance with said non-continuous detection of said scanning time period.

7. An optical scanner according to claim 6, wherein said second reference point of said scanning light, deflected by said reflecting surface, and said first reference point of said scanning light, to be deflected by a subsequent reflecting surface, are detected by a single optical detector.

8. An optical scanner according to claim 6, further comprising a memory means for storing modulation frequency data of said light source to be varied for each said reflecting surface.

9. The optical scanner according to claim 6, said frequency varying means comprising means for compensating for deformation of said rotatable optical deflector.

10. The optical scanner according to claim 6, said frequency varying means comprising means for compensating for scanning error.

11. An optical scanner, comprising;

a light source which emits light modulated in accordance with drawing data formed as a predetermined number of drawing dots with respect to a predetermined drawing length;

a hologram deflector comprising a plurality of hologram facets through which light emitted from said light source passes, said hologram deflector being rotated to scan an image surface with a light emitted from said light source;

an optical detector that detects a light that passes through at least a first reference point, for a commencement of a scanning, and a second reference point, for a completion of said scanning, in a scanning direction;

a scanning time detector that detects a scanning time period for said light, deflected by each said hologram facet of said hologram deflector, to travel from said first reference point to said second reference point;

frequency varying means for varying a modulation frequency of said light source when a respective unique scanning time period for at least one said hologram facet differs from a respective unique scanning time period for another hologram facet so that said predetermined number of drawing dots are contained within said drawing length scanned by each said hologram facet;

wherein said modulation frequency for each said hologram facet is varied prior to an initial scanning operation; and means for intermittently updating said varied modulation frequency for each said hologram facet according to change in said scanning time period detected by a non-continuous detection of said scanning time period.

12. The optical scanner according to claim 11, said frequency varying means comprising means for compensating for deformation of said hologram deflector.

13. The optical scanner according to claim 11, said frequency varying means comprising means for compensating for scanning error.

14. An optical scanner, comprising:

a light source which emits light to be modulated so as to be turned ON and OFF in accordance with drawing data formed as a predetermined number of drawing dots with respect to a predetermined drawing length;

a hologram deflector made of a rotatable planar hologram disc, a peripheral surface of said hologram deflector provided with a plurality of hologram facets through which light emitted from said light source passes, said hologram deflector being rotated to scan an image surface with light emitted from said light source;

an optical detector that detects light that passes through at least a first reference point, for commencement of a scanning, and a second reference point, for completion of said scanning, said first and second reference points being spaced in a scanning direction;

a scanning time detector that detects a scanning time period that said light, deflected by each said hologram facet of said hologram disc, takes to travel from said first reference point to said second reference point;

a frequency varying system that varies a modulation frequency of said light source for each said hologram facet in accordance with a unique scanning time period for each said hologram facet detected by said scanning time detector so that said predetermined number of drawing dots are contained within said drawing length scanned by each said hologram facet; and an intermittent detecting and adjusting system that intermittently detects said scanning time period and adjusts said modulation frequency for each said hologram facet in response to said intermittent detecting of said scanning time period.

15. An optical scanner according to claim 14, wherein said second reference point of said scanning light deflected by said hologram facet, and said first reference point of said scanning light to be deflected by a subsequent hologram facet, are detected by a single optical detector.

16. An optical scanner according to claim 14, further comprising a memory that stores modulation frequency data of said light source to be varied for each said hologram facet.

17. The optical scanner according to claim 14, said frequency varying system comprising a system that compensates for deformation of said hologram deflector.

18. The optical scanner according to claim 14, said frequency varying system comprising a system that compensates for scanning error.

19. An optical scanner, comprising:

a light source which emits light to be modulated so as to be turned ON and OFF in accordance with drawing data formed as a predetermined number of drawing dots with respect to a predetermined drawing length;

a rotatable optical deflector, a peripheral portion of said rotatable optical deflector having a plurality of reflecting surfaces to scan an image surface with light emitted from said light source;

an optical detector that detects passing of said emitted light through at least a first reference point, for commencement of a scanning, and a second reference point, for completion of said scanning, said first and second reference points being spaced in a scanning direction;

a scanning time detector that detects a scanning time period that said emitted light, deflected by each reflecting surface, takes to travel from said first reference point to said second reference point;

a frequency varying system that varies a modulation frequency of said light source for each said reflecting surface in accordance with a unique scanning time period for each said reflecting surface detected by said scanning time detector so that said predetermined number of drawing dots are contained within said drawing length scanned by each said reflecting surface; and a non-continuous detecting and adjusting system that non-continuously detects said scanning time period and that adjusts said modulation frequency for each said reflecting surface in accordance with said non-continuous detection of said scanning time period.

20. An optical scanner according to claim 19, wherein said second reference point of said scanning light, deflected by said reflecting surface, and said first reference point of said scanning light, to be deflected by a subsequent reflecting surface, are detected by a single optical detector.

21. An optical scanner according to claim 19, further comprising a memory that stores modulation frequency data of said light source to be varied for each said reflecting surface.

22. The optical scanner according to claim 19, said frequency varying system comprising a system that compensates for deformation of said rotatable optical deflector.

23. The optical scanner according to claim 19, said frequency varying system comprising a system that compensates for scanning error.

24. An optical scanner, comprising:

a light source which emits light modulated in accordance with drawing data formed as a predetermined number of drawing dots with respect to a predetermined drawing length;

a hologram deflector comprising a plurality of hologram facets through which light emitted from said light source passes, said hologram deflector being rotated to scan an image surface with light emitted from said light source;

an optical detector that detects light that passes through at least a first reference point, for commencement of a scanning, and a second reference point, for completion of said scanning, said first and second reference points being spaced in a scanning direction;

a scanning time detector that detects a scanning time period for said light, deflected by each said hologram facet of said hologram deflector, to travel from said first reference point to said second reference point;

a frequency varying system that varies a modulation frequency of said light source when a respective unique scanning time period for at least one said hologram facet differs from a respective unique scanning time period for another hologram facet so that said predetermined number of drawing dots are contained within said drawing length scanned by each said hologram facet;

wherein said modulation frequency for each said hologram facet is varied prior to an initial scanning operation; and a system that intermittently updates said varied modulation frequency for each said hologram facet according to change in said scanning time period detected by a non-continuous detection of said scanning time period.

25. The optical scanning according to claim 24, said frequency varying system comprising a system that compensates for deformation of said hologram deflector.

26. The optical scanner according to claim 24, said frequency varying system comprising a system that compensates for scanning error.

* * * * *